Patented Aug. 25, 1925.

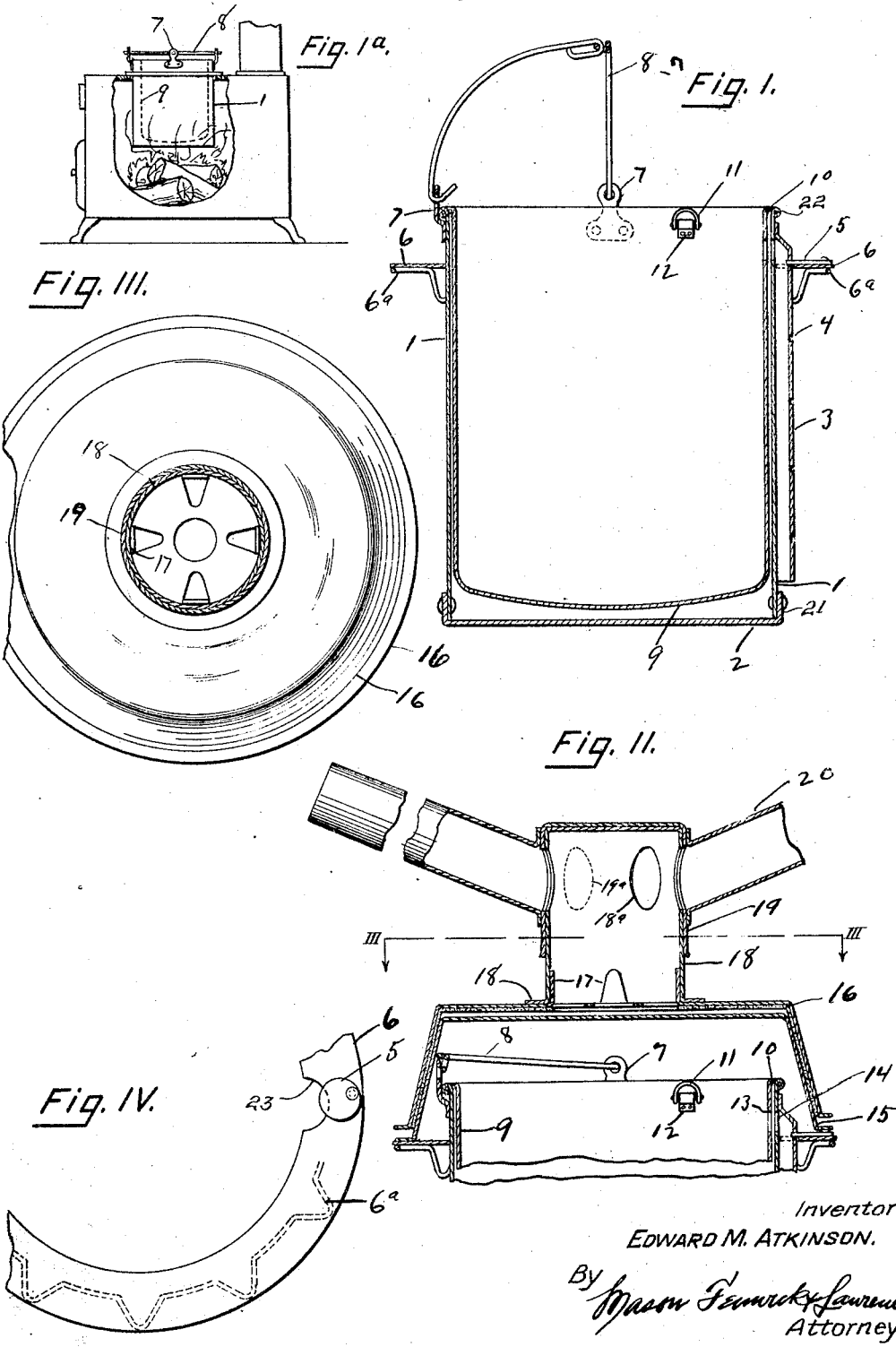

1,551,232

UNITED STATES PATENT OFFICE.

EDWARD M. ATKINSON, OF PORTLAND, OREGON.

COMBINATION COOKER AND HEATER.

Application filed August 14, 1924. Serial No. 732,078.

*To all whom it may concern:*

Be it known that I, EDWARD M. ATKINSON, a citizen of the United States, residing at Portland, in the county of Multnomah and State of Oregon, have invented certain new and useful Improvements in Combination Heaters and Cookers; and I do hereby declare the following to be a full, clear, and exact description of the invention, such as will enable others skilled in the art to which it appertains to make and use the same.

This invention relates to an improved type of cooking and heating device, adapted for use in connection with any ordinary cooking or heating stove, and adapted to obtain the maximum efficiency from the fire in the stove, by contacting with flames at a point beneath the top of the stove.

The objects of the invention are to provide improvements for greater efficiency, and for a greater number of uses, in and for the devices described and claimed in my Letters Patent No. 1,223,552, issued to me April 24, 1917.

The particular objects of this invention are to provide an auxiliary receptacle or utensil to fit into the outer form of receptacle described in said Letters Patent, which said inner and auxiliary receptacle shall be constructed preferably from aluminum, or similar metal which may be easily cleaned and maintained with a clean, smooth inner surface within which foods may be quickly cooked, and the outer surface of the auxiliary receptacle shall be protected from actual contact with the flames and smoke, by the walls of the outer receptacle, and still the extreme heat from the inner part of the stove may be utilized in cooking foods.

A further particular improvement are auxiliary covers and heat distributors for attachment over the top of the heater receptacle, which covers may be used either while the inner receptacle is in use for cooking or may be used only while the heater receptacle is in operation for heating the atmosphere of a building.

The invention consists in the novel construction, arrangement and combination of parts as hereinafter more particularly described.

I have described my invention in connection with the accompanying drawings, of which Figure 1 is a vertical cross-section.

Figure 2 is a vertical cross-section through the top of the cooker and heater attachments.

Figure 3 is a top plan of the covers of the cookers, partly in section, taken on line 3—3 of Figure 2.

Figure 4 is a view of a segment plan of the collar for the cooker.

Figure 1$^a$ is a perspective view of a stove partly in section showing the cooker and heater in position.

Like numerals on different figures represent like parts.

In accordance with the present invention a casing 1 preferably cylindrical is fitted to a bottom 2, provided with a peripheral flange 21 within which the casing 1 is adapted to seat, and secured thereto either by rivets as illustrated, or by welding or crimping as may be expedient, the object being to secure a tight joint not readily affected by the direct application of dry heat. The upper edge of the casing 1 is flared outwardly as illustrated at 22 and a tubular member 3 is secured upon the outer face of the casing 1 in axial alignment therewith the top of tube 3 being closed and the bottom open, and the outer wall provided with a plurality of spaced notches 4.

A ring 6 is slidably mounted upon casing 1 being provided with a notch 23 to accommodate tube 3 and having a ledge 5 pivoted adjacent notch 23 adapted to engage one of the notches 4 in tube 3 to maintain the ring 6 in adjusted relation to the tubular container 1. Ears 7 are riveted upon opposite sides of the casing 1 to accommodate a bail 8, by means of which the container can be readily handled. The tubular guide 6 may be adjustably stiffened by a supplementary reenforcement ring 6$^a$, of angular cross section suitably secured thereto.

A supplementary or auxiliary container 9 having a closed bottom and an open top and preferably made from aluminum or other similar and suitable material is provided, having its upper edge outwardly flared as at 10 to seat over the flange 22 of the outer container 1 to maintain the inner container in spaced relation within the outer container. The inner container 9 is further provided upon its inner upper surface with small handles 11 secured thereto by plugs 12 riveted or otherwise secured to the inner container. This supplementary inner container is adapted to receive foods to be cooked, and it will be noted is exposed to the heated gases and radiated heat within the outer container 1. A closure 15 is provided adapted to seat upon the ring flange 6 entirely enclosing the upper parts of both containers, together with the bails or the inner container may, if desired, be closed by any ordinary top. A second auxiliary closure 16 is also provided having a plurality of tongues 17 struck up from the top thereof in a circular arrangement to provide a flange adapted to receive a tubular member 18 having a plurality of circumferentially spaced holes 18ª. A second tubular cap member 19 is adapted to slidably seat over the tubular member 18 and is provided with a plurality of similarly situated openings 19ª adapted to register with the openings 18ª in the tubular member 18. By rotating the tubular member 19 upon the tubular member 18 the openings 18ª and 19ª may be adjusted either to complete alignment or not, as desired. A plurality of pipes 20 are suitably secured to the tubular member 19 in alignment with the openings 19ª to convey heat from the tubular member 18 throughout a room or dwelling, as desired.

Having thus fully described my invention I claim:

In combination a cooker and heater with an outer chamber formed to pass a predetermined distance within the firebox of a stove, with an inner chamber formed to pass into the outer chamber for cooking purposes, with an outlet from the inner chamber to the outer surface of the outer chamber, with means for supporting the inner chamber in the outer chamber and means for removing the said inner chamber from the outer chamber, with a cover extending over both chambers described, having openings into a heat chamber above the cover, and means for distributing the heat from the latter chamber.

In testimony whereof I affix my signature.

EDWARD M. ATKINSON.